United States Patent
Kim et al.

(10) Patent No.: US 9,819,461 B2
(45) Date of Patent: Nov. 14, 2017

(54) METHOD FOR RECEIVING COORDINATED SIGNAL ON BASIS OF TERMINAL-TO-TERMINAL DIRECT COMMUNICATION AND APPARATUS THEREFOR

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Dongin Kim, Seongnam-si (KR); Duckdong Hwang, Yongin-si (KR); Wan Choi, Seoul (KR); Hanbyul Seo, Anyang-si (KR); Byounghoon Kim, Anyang-si (KR)

(73) Assignees: LG ELECTRONICS INC., Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 10 days.

(21) Appl. No.: 15/034,104

(22) PCT Filed: Nov. 22, 2013

(86) PCT No.: PCT/KR2013/010675
§ 371 (c)(1),
(2) Date: May 3, 2016

(87) PCT Pub. No.: WO2015/068887
PCT Pub. Date: May 14, 2015

(65) Prior Publication Data
US 2016/0285601 A1 Sep. 29, 2016

Related U.S. Application Data

(60) Provisional application No. 61/901,447, filed on Nov. 8, 2013.

(51) Int. Cl.
*H04L 5/00* (2006.01)
*H04B 7/08* (2006.01)
(Continued)

(52) U.S. Cl.
CPC ........... *H04L 5/0032* (2013.01); *H04B 7/026* (2013.01); *H04B 7/0617* (2013.01);
(Continued)

(58) Field of Classification Search
CPC .... H04B 7/026; H04B 7/0619; H04B 7/0617; H04B 7/0857; H04L 5/0032
See application file for complete search history.

(56) References Cited

U.S. PATENT DOCUMENTS

2005/0135286 A1* 6/2005 Nurminen ............. H04W 84/18
370/310
2010/0322351 A1* 12/2010 Tang ...................... H04B 7/024
375/316
(Continued)

OTHER PUBLICATIONS

Alcatel-Lucent et al., "Signalling of Network Assistance Information in NAICS," 3GPP TSG-RAN WG1 Meeting #74bis, R1-134236, Guangzhou, China, Oct. 7-11, 2013, 3 pages.
(Continued)

*Primary Examiner* — Asad Nawaz
*Assistant Examiner* — Syed S Ali
(74) *Attorney, Agent, or Firm* — Birch, Stewart, Kolasch & Birch, LLP

(57) ABSTRACT

Disclosed is a method for receiving a coordinated signal by a terminal on the basis of a terminal-to-terminal direct communication. Specifically, the method comprises the steps of: receiving a coordinated signal including an interference signal and a valid signal from a relay terminal; detecting an interference signal component by performing a first maximum-ratio combining on the coordinated signal; transmitting a first feedback information to the relay termi-
(Continued)

nal if the detection of the interference signal component fails, and detecting a valid signal component by performing a second maximum-ratio combining if the detection of the interference signal component is successful; and transmitting a second feedback information to the relay terminal if the detection of the valid signal component fails.

4 Claims, 4 Drawing Sheets

(51) Int. Cl.
    *H04B 7/06*     (2006.01)
    *H04B 7/026*     (2017.01)

(52) U.S. Cl.
    CPC ......... *H04B 7/0619* (2013.01); *H04B 7/0632* (2013.01); *H04B 7/0857* (2013.01)

(56) References Cited

U.S. PATENT DOCUMENTS

| | | | |
|---|---|---|---|
| 2012/0077511 A1 | 3/2012 | Shin et al. | |
| 2012/0099470 A1* | 4/2012 | Li | H04B 7/024 370/252 |
| 2013/0021925 A1* | 1/2013 | Yin | H04B 7/024 370/252 |
| 2013/0021929 A1* | 1/2013 | Kim | H04B 7/024 370/252 |
| 2013/0078991 A1* | 3/2013 | Nam | H04B 7/024 455/423 |
| 2013/0089023 A1* | 4/2013 | Shin | H04B 7/155 370/315 |
| 2013/0190012 A1* | 7/2013 | Suzuki | H04W 36/04 455/456.1 |
| 2014/0112195 A1* | 4/2014 | Tan | H04B 7/024 370/254 |
| 2015/0117237 A1* | 4/2015 | Wang | H04B 7/024 370/252 |

OTHER PUBLICATIONS

KDDI, "Views on D2D communication," 3GPP TSG RAN WG1 Meeting #74, R1-133311, Barcelona, Spain, Aug. 19-23, 2013, pp. 1-6.

Orange, "NAICS: How to coordinate link adaptation for CWIC receivers," TSG-RAN WG1 #74bis, R1-134673, Guangzhou, China, Oct. 7-11, 2013, 4 pages.

Samsung, "Discussion on Relay Functionality for D2D Group Communication," 3GPP TSG RAN WG1 Meeting #74, R1-133118, Barcelona, Spain, Aug. 19-23, 2013, 2 pages.

* cited by examiner

METHOD FOR RECEIVING COORDINATED SIGNAL ON BASIS OF TERMINAL-TO-TERMINAL DIRECT COMMUNICATION AND APPARATUS THEREFOR

CROSS REFERENCE TO RELATED APPLICATIONS

This application is the National Phase of PCT International Application No. PCT/KR2013/010675, filed on Nov. 22, 2013, which claims priority under 35 U.S.C. 119(e) to U.S. Provisional Application No. 61/901,447, filed on Nov. 8, 2013, all of which are hereby expressly incorporated by reference into the present application.

FIELD OF THE INVENTION

The present invention relates to device-to-device direct communication and, most particularly, to a method of a user equipment (or terminal) for receiving a coordinated signal on the basis of terminal-to-terminal (or device-to-device) direct communication and an apparatus therefor.

BACKGROUND ART

Recently, the demand for wireless data has been growing exponentially. And, accordingly, the demand for wireless data is expected to exceed the capacity that can be provided by a network, which is based on the current cellular standard.

In order to resolve this, in the 3GPP LTE-A (3rd Generation Partnership Project Long Term Evolution-Advanced) system, and so on, a heterogeneous network (HetNet), which is based on small cells (or small base stations), and so on, is being considered. In the HetNet, depending on the situation, Picos, Femtos, Relay stations, Distributed Antenna Systems, and so on, are distributed within a Macro cell, and, accordingly, an area capacity of a cell is increased significantly by distributing (or dispersing) the load of the macro cell and by increasing the re-usage rate.

However, when small cells (or small base stations) are concentrated as described above, since inter-cell interference increases, coordination between the nodes for controlling such interference becomes important. Another trend in future communications is based on device-to-device (D2D) direct communication, wherein communication between devices (or device-to-device communication) does not pass through an Access Point. Herein, a device includes all types of devices including user equipments that receive data service through a communication protocol following the cellular standard. Additionally, diverse methods are being taken into consideration, such as Coordinated Multipoint (CoMP) that is considered for inter-cell interference control, inter-cell coordinated beamforming, inter-cell coordination when performing resource allocation, and so on.

According to the related art interference controlling method, which is based on inter-cell coordination, a significant amount of overhead is generated in order to allow the base stations to share the channel information and the control information, which are used for the coordination. However, if a practically tolerable amount of overhead is generated, the respective performance gain that may be acquired may not be sufficiently large. Therefore, a method for simply reducing the influence, which is caused by the interference, via device-to-device coordination without relying on inter-cell coordination is required.

DETAILED DESCRIPTION OF THE INVENTION

Technical Objects

Based upon the above-described discussion, a method for receiving a coordinated signal on the basis of a terminal-to-terminal (or device-to-device) direct communication and an apparatus therefor will hereinafter be proposed.

Technical Solutions

The present invention relates to a method of a user equipment for receiving a coordinated signal based on device-to-device direct communication which, more specifically, includes the steps of receiving a coordinated signal including an interference signal and a valid signal from a relay user equipment; detecting an interference signal component by performing first maximal ratio combining on the coordinated signal; in case the detection of the interference signal component fails, transmitting first feedback information to the relay user equipment, and, in case the detection of the interference signal component is successful, detecting a valid signal component by performing second maximal ratio combining; and, in case the detection of the valid signal component fails, transmitting second feedback information to the relay user equipment.

Preferably, the received coordinated signal corresponds to a value acquired by multiplying the interference signal and valid signal being received by the relay user equipment by a coordinated beamforming matrix W, and the coordinated beamforming matrix W corresponds to $\rho$ b $a^H$, $\rho$ corresponds to a scaling factor for adjusting a transmission power, and a vector is decided by at least one of the first feedback information and the second feedback information.

More preferably, the a vector is decided by the equation shown below:

$$a = \frac{\alpha g_1 + (1-\alpha)h_1}{\|\alpha g_1 + (1-\alpha)h_1\|}, \qquad \text{<Equation>}$$
$$0 \leq \alpha \leq 1$$

(Herein, g1 corresponds to an interference signal channel, h1 corresponds to a valid signal channel, and $\alpha$ corresponds to a value that successively decreased from 1 in accordance with the feedback information.)

More preferably, the method further includes performing Successive Interference Cancellation (SIC), in case the detection of the interference signal is successful.

More preferably, the coordinated signal is received by using an Amplify-and-forward (AF) relay protocol.

More preferably, the coordinated signal is received through an uplink channel.

Advantageous Effects

According to the exemplary embodiment of the present invention, a user equipment (or terminal) may effectively receive a coordinated signal from a relay user equipment on the basis of device-to-device direct communication.

The effects of the present invention will not be limited only to the effects described above. Accordingly, effects that

BEST MODE FOR CARRYING OUT THE PRESENT INVENTION

Hereinafter, reference will now be made in detail to the preferred embodiments of the present invention, examples of which are illustrated in the accompanying drawings. The detailed description of the present invention is provided to facilitate the understanding of the configuration, operation, and other characteristics of the present invention.

Figure 1:
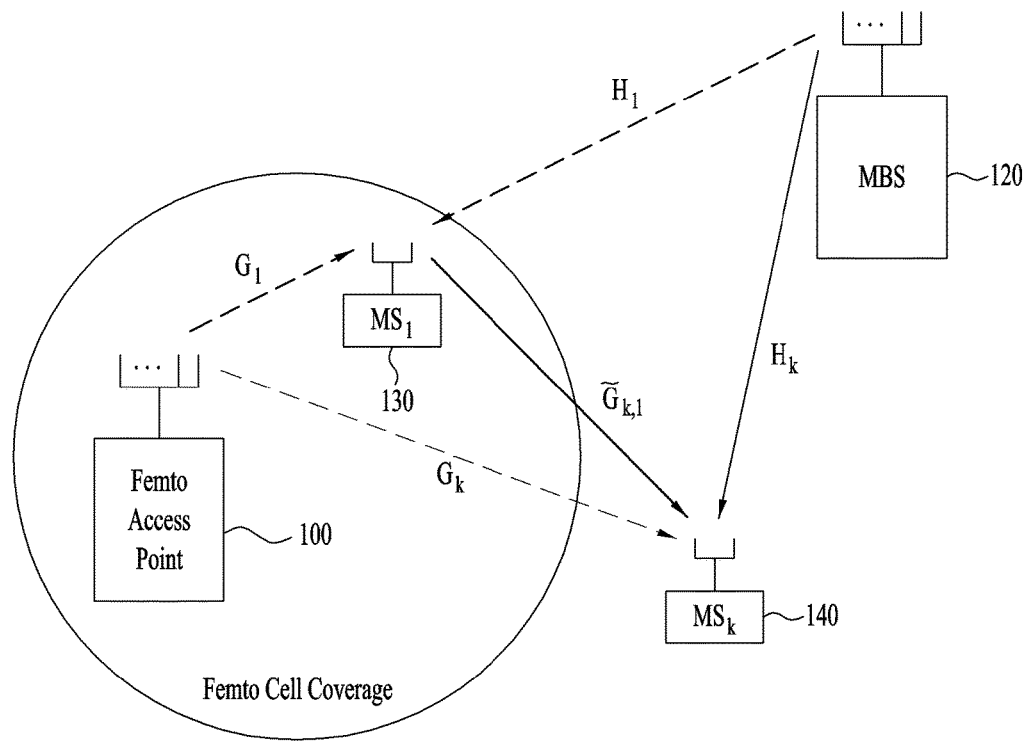
FIG. 1 illustrates a communication network environment to which the present invention is applied.

FIG. 1 illustrates a communication system to which the present invention is applied.

Referring to FIG. 1, in a heterogeneous network environment, while a macro user (hereinafter referred to as a $MS_K$, 140) approaches a proximity of a Femto Station (FS, 110), in case another femto cell provides a service to the $MS_K$ (140), the $MS_K$ (140) processes an interference signal, which is received from the femto cell. In this case, a femto cell user (130, hereinafter referred to as $MS_1$) that was not participating in the communication overhears the signal from the macro and the femto. The $MS_1$ (130) sends the signal to $\tilde{G}_{k,1}$ through a device-to-device direct channel. This is referred to as device-to-device (D2D) coordination. In this case, the D2D function acquires in advance radio resources for the usage of the $\tilde{G}_{k,1}$ in order to allow the $MS_1$ (130) to send a coordinated signal to the $MS_K$ (140), and the D2D function also ensures the respective Channel Status Information (CSI). The coordination uses an Amplify-and-Forward relay protocol.

The $MS_K$ (140) of the present invention receives a downlink signal from the Base Station (BS, 120). Additionally, the FS (110) transmits a downlink signal to another user existing in its coverage. If the $MS_K$ (140) is positioned sufficiently far away from the Base Station (120), and if the $MS_K$ (140) approaches the proximity of the coverage of the FS (110), and if the two signals use the same resource, the $MS_K$ (140) eventually receives a signal that is interfered by the signals received from the Base Station (120) and the FS (110). Each of the Base Station (120), FS (110), $MS_1$ (130), and $MS_K$ (140) uses multiple antennas, and matrix channels between each node are as shown in FIG. 1. The dimension of the matrices follows the number of antennas and the relay user equipment $MS_1$ (130) transmits a vector, which is configured of a received signal vector being multiplied by a coordinated beamforming matrix W, to the $MS_K$ (140) through the transmission multi-antenna. The coordinated signal transmitted from the relay UE $MS_1$ (130) is transmitted through an uplink channel, which is authorized in advance in order to allow the $MS_1$ (130) to use it.

A precoder vector that is used by the Base Station (120) in order to perform downlink transmission to the macro user, $MS_K$ (140) is referred to as $p_b$, and a precoder vector that is used by the FS (110) for the femto user is referred to as $p_f$. Additionally, a reception beamformer vector that allows the $MS_K$ (140) to receive a coordinated signal from the $MS_1$ (130) during an uplink section is referred to as $q_u$. In this case, the relationship between the indicated channel matrix and the effective channel may be defined as shown in Equations 1, 2, and 3.

$$h_i = H_i p_b, \; i=\{1,k\} \quad \text{[Equation 1]}$$

$$g_j = H_j p_f, \; j=\{1,k\} \quad \text{[Equation 2]}$$

$$\tilde{g}_{k,1} = \tilde{G}_{k,1}{}^H q_u. \quad \text{[Equation 3]}$$

Additionally, the reception signal being received by $MS_j$, $j=1, k$ during a downlink may be defined as shown in Equation 4.

$$y_j = h_j x_b + g_j x_f + n_j \quad \text{[Equation 4]}$$

Herein, $x_b$, $x_f$, $n_j$ respectively indicate a transmission symbol of the Base Station (120), a transmission symbol of the FS (110), and a noise vector that is added to the antenna of $MS_j$.

Hereinafter, in case the $MS_1$ (130) transmits a coordinated signal to the $MS_K$ (140) through a transmission multi-antenna, the coordinated beamforming matrix W that is used for the multiplication with the received signal will be described in detail.

1. $MS_1$ (130) Coordinated Beamforming Matrix W

The relay UE $MS_1$ (130) transmits a $Wy_1$ vector through a pre-scheduled uplink resource by multiplying a reception signal $y_1$ and a coordinated beamforming matrix W that is based on AF.

In this case, the signal that is received by the $MS_K$ (140) through the uplink channel may be defined as shown in Equation 5.

$$r_k = \tilde{g}_{k,1}{}^H W h_1 x_b + \tilde{g}_{k,1}{}^H W g_1 x_f + \tilde{n}_k. \quad \text{[Equation 5]}$$

Herein, $\tilde{n}_k = q_u{}^H \tilde{G}_{k,1} W n_1 + n'_k$, and $n'_k$ represents a noise vector that is received by the $MS_K$ (140) through the uplink channel.

If the $MS_1$ (130) has information related to channel $\tilde{g}_{k,1}$ due to the device-to-device (D2D) communication, the coordinated beamforming matrix W may be defined as two different types as shown in Equation 6.

$$W_{ZF} = \rho_{ZF} b a^H, \; W_{SINR} = \rho_{SINR} b a^H. \quad \text{[Equation 6]}$$

Herein, ZF corresponds to a method of performing complete null out on a valid signal that is being transmitted from the Base Station (120) based on zero forcing, and SINR (Signal to interference-plus-noise ratio) corresponds to a method that maximizes the SINR of an interference signal component that is being transmitted from the FS (110).

Accordingly, vector b corresponds to a vector that has normalized the $\tilde{g}_{k,1}$ vector, and, in case of ZF, vector a corresponds to a normalized vector of $(I_{M_u} - h_1 h_1{}^H / |h_1{}^H h_1|) g_1$, and, in case of SINR, vector a corresponds to an eigenvector having a non-zero eigenvalue of $(h_1 h_1{}^H + I_{M_m}/P_b)^{-1} g_1 g_1{}^H$, which is a rank-one matrix. Herein, $I_{M_m}$ represents a $M_m \times M_m$ identity matrix, and $P_b$ indicates the power of the Base Station (120). A scaling factor $\rho$ for adjusting the transmission power of the $MS_1$ (130) may be defined as shown in Equation 7.

$$\rho = \sqrt{\frac{P_1}{|a^H h_1|^2 P_b + |a^H g_1|^2 P_f + 1}}$$ [Equation 7]

Herein, herein, $P_1$, $P_b$, and $P_f$ respectively correspond to used power of the $MS_1$ (130), the base station (120), and the FS (110).

Hereinafter, a procedure for acquiring a valid signal by an $MS_K$ (140), which has received the coordinated signal from the $MS_1$ (130), will be described in detail.

2. Dual Stage MRC-SIC Detection of $MS_K$ (140)

After combining two signals respectively received from the downlink channel and the uplink channel, the $MS_K$ (140) carries out a Maximal Ratio Combining (MRC) and Successive Interference Cancellation (SIC) procedure, which is configured of 2 stages. More specifically, by successively performing Dual-stage MRC-SIC detection, $x_b$ is finally detected. The Dual-stage MRC-SIC method is carried out by first detecting an interference signal $x_f$, and, then, after cancelling (or removing) the component caused by the interference signal, a valid signal $x_b$ is detected from the remaining signal.

Figure 2:
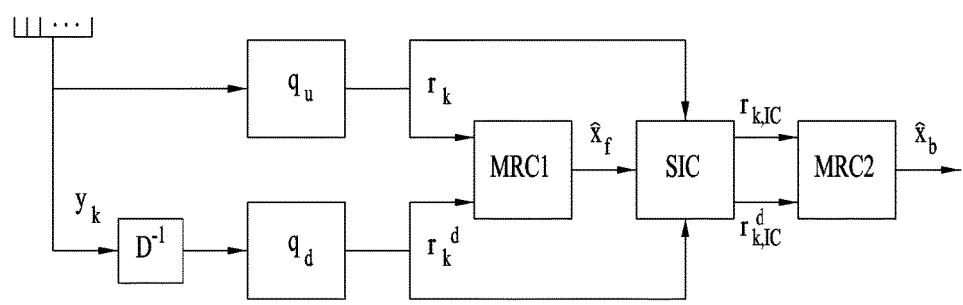
FIG. 2 illustrates a drawing for describing a Dual-stage MRC-SIC method according to an exemplary embodiment of the present invention.

FIG. 2 illustrates a drawing for describing a Dual-stage MRC-SIC method according to an exemplary embodiment of the present invention.

Referring to FIG. 2, in order to perform 1st-stage MRC (Maximal Ratio Combining), the $MS_K$ (140) respectively acquires sufficient statistics from $y_k$, which is received via downlink, and from $r_k$, which is received via uplink, by using each of the reception beamformer vectors $q_d$, $q_u$. In order to perform $x_f$ signal detection, MRC is applied to the acquired sufficient statistics. Herein, $q_u$ corresponds to an eigenvector having a maximum eigenvalue of matrix $\tilde{G}_{k,1}$, and $q_d$ corresponds to an eigenvector having a non-zero eigenvalue of $(h_k h_k^H + I_{M_m}/P_b)^{-1} g_k g_k^H$ in order to acquire a maximum SINR for acquiring $x_f$. After performing the SIC procedure, which cancels (or removes) the interference component by using the interference signal $x_f$ that is detected after performing the 1st-stage MRC, 2nd-stage MRC for detecting the valid signal $x_b$ is performed so as to detect the valid signal $x_b$.

Hereinafter, a procedure for searching for the $MS_K$ (140), which has performed the 2 stage MRC-SIC, and the $MS_1$ (130), which corresponds to a coordinated relay user equipment, will be described in detail with reference to FIG. 3.

Figure 3:
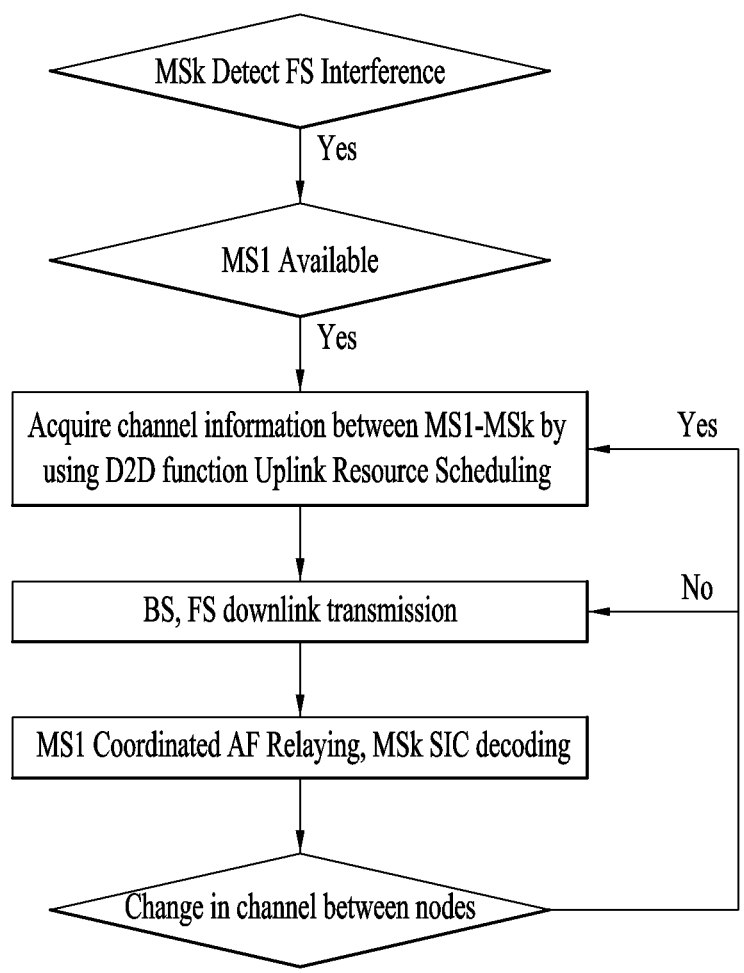
FIG. 3 illustrates a drawing for describing a flow of an entire system of the present invention.

FIG. 3 illustrates a drawing for describing a flow of an entire system of the present invention.

Referring to FIG. 3, in case the $MS_K$ (140) detects an interference signal from the FS (110), it can be known that the $MS_K$ (140) searches for the presence of an available coordinated relay UE $MS_1$ (130).

The $MS_K$ (140) reports the interference situation to the FS (110) (or through the Base Station (120)). The FS (110) determines whether or not an available coordinated relay UE $MS_1$ (130) exists. In case an available $MS_1$ (130) exists, a procedure for acquiring a relay channel $\tilde{G}_{k,1}$ by using the D2D function is carried out in coordination with the $MS_K$ (140). Additionally, the $MS_K$ (140) requests for the usage of an uplink resource for transmitting the coordinated signal to the FS (110) (in accordance with the resource allocation principle). As long as the channels do not change, the coordination is carried out by using the same beamformer/precoder.

3. Adaptive Beamforming Control

Referring to the operation flow of the entire system, if the channel changes, it is shown that, the coordinated beamforming matrix of the relay UE is changed to fit the new channel through the D2D channel. In this case, among the two vectors of the beamformer of the relay UE, only the vector b changes. However, the change in the coordinated beamforming matrix of the relay UE is not limited only to a case when the channel changes, and, therefore, the change may also be carried out for performing fine tuning of the beamforming.

Figure 4:
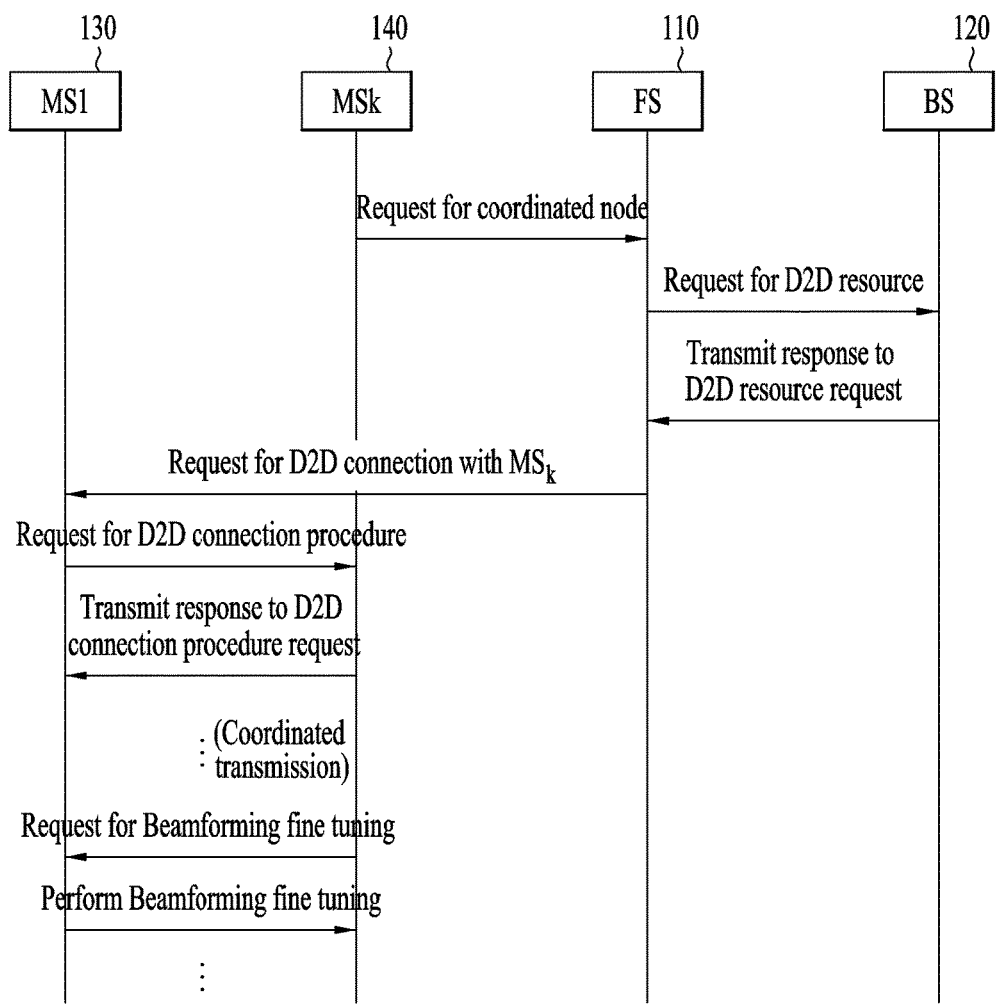
FIG. 4 illustrates an overall flow of a signal including adaptive beamforming control according to an exemplary embodiment of the present invention.

FIG. 4 illustrates an overall flow of a signal including adaptive beamforming control according to an exemplary embodiment of the present invention.

Referring to FIG. 4, it may be known that the initial coordinated beamforming is decided by the coordinated node $MS_1$ (130). In this case, the coordinated node $MS_1$ (130) maximizes the interference to zero forcing or maximizes the SINR of the interference signal. This is because the final reception status of the $MS_K$ (140) is unknown.

Conversely, for the $MS_K$ (140), it is sufficient for the size of the interference signal component to be equivalent to the size required for detecting an interference signal $x_f$ by performing 1st-stage MRC. If an interference signal is detected, in order to more successfully detect a valid signal $x_b$ by performing 2nd-stage MRC, fine tuning is performed on vector a of the coordinated beamformer. For this, the $MS_K$ (140) feeds back information for performing fine tuning on a to the $MS_1$ (130). The feedback corresponds to simple binary (+, −) information, which may correspond to feedback information that allows a direction of a to face the same direction as a wanted interference signal $x_f$, or which may correspond to feedback information having acquired the signal-to-interference ratio.

Meanwhile, referring to FIG. 3, the vector that can be varied (or the variable vector) may correspond to a and $q_d$.

Figure 5:
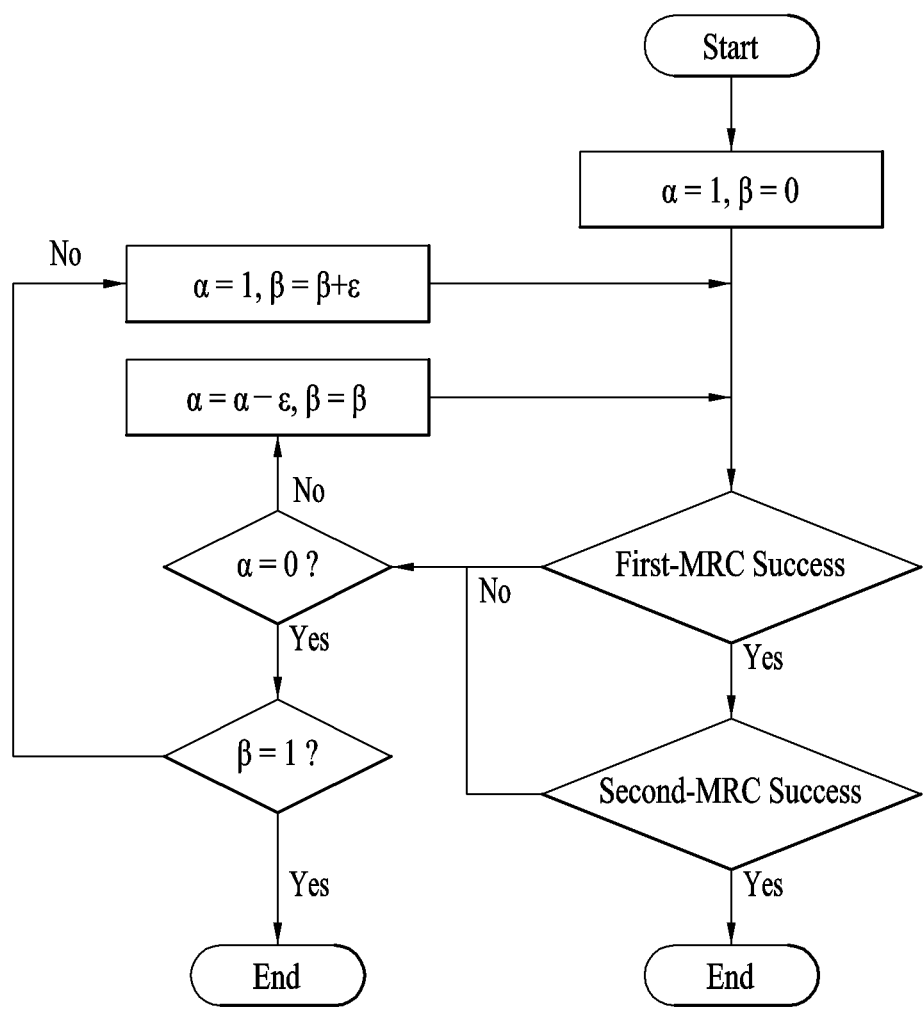
FIG. 5 illustrates a flow of a beamforming fine tuning procedure according to an exemplary embodiment of the present invention.

FIG. 5 illustrates a flow of a beamforming fine tuning procedure according to an exemplary embodiment of the present invention.

Referring to FIG. 5, after the $q_d$ is set (or configured) firsthand, the a vector is processed with fine tuning in units of ϵ through the feedback information. At this point, the combination of a and $q_d$ vectors may be defined as shown in Equation 8 and Equation 9.

$$a = \frac{\alpha g_1 + (1-\alpha) h_1}{\|\alpha g_1 + (1-\alpha) h_1\|},$$ [Equation 8]

$$0 \le \alpha \le 1$$

$$q_d = \frac{\beta g_k + (1-\beta) h_k}{\|\beta g_k + (1-\beta) h_k\|},$$ [Equation 9]

$$0 \le \beta \le 1$$

Herein, α and β correspond to variables having step sizes of ϵ for performing fine tuning, and α is set up as a variable assigning weight along a direction from $g_1$ (interference signal) to $h_1$ (valid signal) in accordance with the feedback signal. The β value is also set to change the weight from the initially configured $q_d$ toward the direction of $g_k$ (interference signal) or $h_k$ (valid signal). In case of setting up the initial value of each variable, α is assigned with a value of 1 by setting a priority weight to $g_1$, which corresponds to the direction of the interference signal. This is because α is involved in the a vector within the coordinated UE (or relay UE). Conversely, β is assigned with an initial value of 0 by setting a priority weight to $h_k$, which corresponds to the direction of the valid signal. Thereafter, α is processed with fine tuning by successively decreasing from 1 to 0, and β is processed with fine tuning by successively increasing from 0 to 1.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In this document, the embodiments of the present invention have been described by mainly focusing on the data transmission and reception relation between the relay node and the base station. Occasionally, in this document, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term Base Station (BS) may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software. In case of implementing the embodiments of the present invention in the form of hardware, the method according to the embodiments of the present invention may be implemented by using at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein.

INDUSTRIAL APPLICABILITY

As described above, the method of a user equipment (or terminal) for receiving a downlink signal in a base station coordinated wireless communication system and the apparatus therefor have been described based upon an example that may be applied to a 3GPP LTE system. However, in addition to the 3GPP LTE system, the exemplary embodiment of the present invention may also be applied to diverse wireless communication systems.

The invention claimed is:

1. A method of a user equipment for receiving a coordinated signal based on device-to-device direct communication, the method comprising:
receiving a coordinated signal including an interference signal and a valid signal from a relay user equipment;
detecting an interference signal component by performing first maximal ratio combining on the coordinated signal;
when the detection of the interference signal component fails, transmitting first feedback information to the relay user equipment, and
when the detection of the interference signal component is successful, detecting a valid signal component by performing second maximal ratio combining; and
when the detection of the valid signal component fails, transmitting second feedback information to the relay user equipment,
wherein the received coordinated signal corresponds to a value acquired by multiplying the interference signal and the valid signal being received by the relay user equipment by a coordinated beamforming matrix W,
wherein the coordinated beamforming matrix W corresponds to ρb $a^H$,
wherein ρ corresponds to a scaling factor for adjusting a transmission power,
wherein a vector is decided by at least one of the first feedback information and the second feedback information, and
wherein the a vector is decided by the equation shown below:

$$a = \frac{\alpha g_1 + (1-\alpha)h_1}{\|\alpha g_1 + (1-\alpha)h_1\|},$$

$$0 \le \alpha \le 1,$$

where g1 corresponds to an interference signal channel, h1 corresponds to a valid signal channel, and α corresponds to a value that is successively decreased from 1 in accordance with the feedback information.

2. The method of claim 1, further comprising:
performing Successive Interference Cancellation (SIC), in case the detection of the interference signal is successful.

3. The method of claim 1, wherein the coordinated signal is received by using an Amplify-and-forward (AF) relay protocol.

4. The method of claim 1, wherein the coordinated signal is received through an uplink channel.

* * * * *